United States Patent [19]

Lorenzo et al.

[11] Patent Number: 5,278,645
[45] Date of Patent: Jan. 11, 1994

[54] OPTIMAL SIGNAL ACQUISITION TECHNIQUE AND SYSTEM

[75] Inventors: Maximo Lorenzo; Joseph R. Moulton, Jr., both of Fredericksburg, Va.

[73] Assignee: The United States of America as represented by the Secretary of the Army, Washington, D.C.

[21] Appl. No.: 899,840

[22] Filed: Jun. 17, 1992

[51] Int. Cl.⁵ .............................................. H04N 5/33
[52] U.S. Cl. ...................................... 358/113; 382/51
[58] Field of Search ............... 358/113; 250/332, 334; 382/51; H04N 7/18, 5/33

[56] References Cited

U.S. PATENT DOCUMENTS 5,081,693 1/1992 Gannon .............................. 358/113
5,118,943 6/1992 LeBars .............................. 358/113

Primary Examiner—Howard W. Britton
Attorney, Agent, or Firm—Milton W. Lee; Alain L. Bashore; Anthony T. Lane

[57] ABSTRACT

A feedback control system utilizing optimal signal acquisition for an automatic real-time sensing system. A sensor generates a continuous train of sensor output signals which are sampled. A histogram is determined from that sample and processed utilizing a digital transinformation technique. A feedback signal is achieved that is used to adjust a control signal of the sensor.

22 Claims, 6 Drawing Sheets

OPTIMAL SIGNAL ACQUISITION TECHNIQUE AND SYSTEM

BACKGROUND OF THE INVENTION

1. Field of the Invention

The field of the invention disclosed herein is directed to signal processing and more specifically to optimal signal acquisition and especially pertaining to automatic control of real-time sensing systems.

2. DESCRIPTION OF RELATED PRIOR ART

The prior art offers several definitions and methods of "optimal" signal acquisition and associated automatic sensor gain control. For analog signal reception or recording, the popularly accepted approach has been to roughly maximize the received signal power while avoiding saturation. This technique is typically performed either by a human operator or built-in AGC (automatic gain control) circuit defined below. In the case of digital signal acquisition (quantization) the conventional approach is known as "minimum mean-square-error" quantization first formally documented by Joel Max in his 1961 paper "Quantizing for Minimum Distortion". In this approach, a human operator or AGC circuit controls an analog signal level while a uniform n-bit level digitizer quantizes the signal into discrete samples.

There are significant problems with the prior art that preclude extraction of the optimal amount of information from a signal. Although a human operator is ultimately the best judge for optimal signal acquisition for himself, he is often not the best judge for another human observer or for a machine vision device. In addition, "man-in-the-loop" approaches prevent real-time optimization for signal acquisition. Although real time, typical AGC circuits simply adjust the gain to ensure a near-constant average signal intensity. The "minimum-mean square error" approach, limits quantization error effects, but for most signal distributions does not ensure the maximum signal information content. In fact, none of these aforementioned approaches in the prior art are optimal in the information-theoretic sense and none address the case where the signal is corrupted by noise.

SUMMARY OF THE INVENTION

The objective of the present invention is to provide a technique and apparatus for signal acquisition that maximizes the actual information received in a noise-limited channel.

The invention disclosed herein is directed to a method of optimal signal acquisition utilizing a feedback control system for an automatic real-time sensing system. A continuous train of sensor output signals are sampled which are used to determine histogram data. The data is processed utilizing a digital transinformation technique to output a feedback signal for interactive adjustment of the control signal of the system. A subprocessing step may be used which restricts processing to one or more subsets of the data, performed by an in it place automatic target recognizer in the preferred embodiment.

BRIEF DESCRIPTION OF THE DRAWINGS

A full and complete understanding of the invention can be obtained from the following detailed description of the invention when read in conjunction with the annexed drawing in which.

PREFERRED EMBODIMENTS

Figure 1:
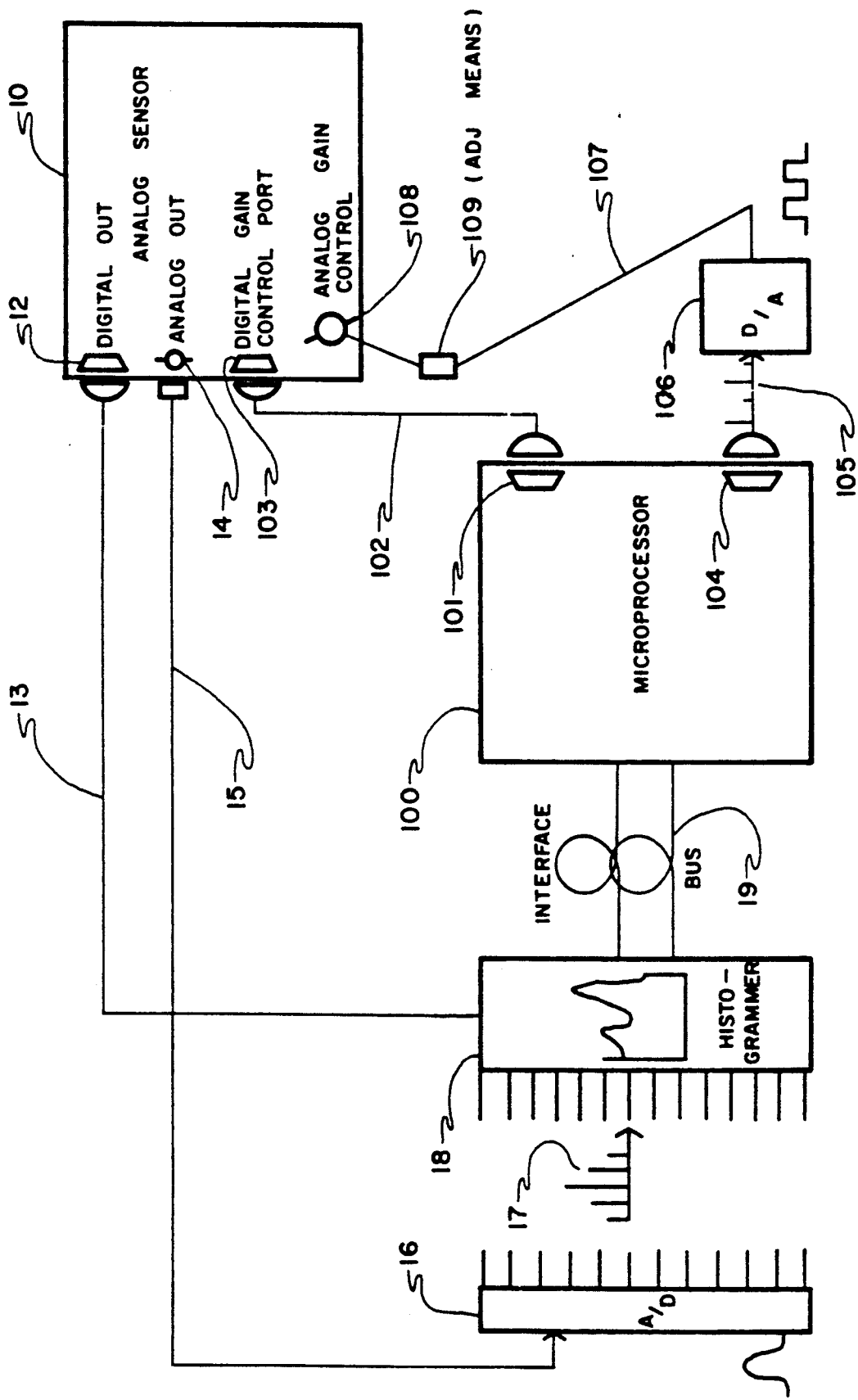
FIG. 1 is the block diagram of the preferred embodiment of the present invention.

The preferred embodiment will now be discussed with reference to the drawing figures. FIG. 1 depicts the block diagram for the method and feedback system utilizing optimal signal acquisition for an automatic real-time sensing system. Sensor 10 is a real-time device that accepts information which is processed and includes output signal means for generation of a continuous train of sensor output signals. The output signals which may be either digital, analog or a combination thereof are a function of a control signal of sensor 10. Digital output signals are sampled by a down-sampling means and then clocked out of digital port 12 and then on through line 13 as a digital signal sample. Analog signals are put into an appropriate format by such means as an RS-170 video and output to analog port 14. Analog sampling and A/D converting means 16 accepts the analog signal from port 14 through line 15 so as to sample the analog signal and convert that sample as a digital signal sample through line 17.

Histogram means 18 accepts the digital signal samples from line 13 and/or 17. The sample that has been determined is a statistically significant number of samples collected for use by histogram means 18. Histogram means 18 functions to determine histogram data from the sample. The output from histogram means 18 is fed through interface bus 19 to processing means 100 which utilizes a digital transinformation technique to process the histogram data from which there is an output of a feedback signal as a digital signal.

The processing step by which processing means 100 determines a feedback signal involves establishing the entropy of the histogram data and then using a digital transinformation (DTI) technique. The entropy of the histogram data is determined by normalization of the data over the entire data range. DTI is the subtracting of a real-time approximation of a determined noise entropy of said data from the determined entropy of the histogram sample according to the following equation:

$$DTI(x, yd) = \Sigma P(yj) \log P(yj) - Hn(k) \cdot \left( \sum_{a+k\sigma n}^{b-k\sigma n} P(yi) + \sum_{a-k\sigma n}^{a+k\sigma n} P(yi) \left( \frac{i+a-k\sigma n}{2k\sigma n} \right) + \sum_{b-k\sigma n}^{b+k\sigma n} P(yi) \left( \frac{i+b-k\sigma n}{2k\sigma n} \right) \right)$$

where p(yj) is the normalized histogram probability of the yj k is the gain a and b are the quantizer limits $\sigma n$ is the sensor noise standard deviation (rms)

$Hn(k)$ is the noise entropy $= \Sigma P(ni) \log P(ni)$ where $P(ni)$ is the noise distribution function.

A subprocessing step may also be present which restricts the processing to one or more subsets of the histogram data to produce unique optimal control signals for each of the subsets processed. All subsets of the data can then be processed to produce an optimal composite signal.

The feedback signal is delivered to processing output ports 101 and 104 which are then utilized by a control adjusting means to adjust the control signal for digital control port 103 and analog control port 108 respectively. For digital control, processor control signals are delivered out of port 101 via line 102 to a digital control port 103 where they are interpreted by means within the sensor and converted to an appropriate control setting. For analog control, processor control signals are delivered out of port 104 via line 105 to a D/A converter means 106 which converts the digital control signal to an analog signal which is set via line 107 and by adjusting means 109 adjusts the analog control 108. It is understood that the invention is not limited to the sensing of a particular part of the electromagnetic spectrum or to a particular control parameter.

Figure 2:
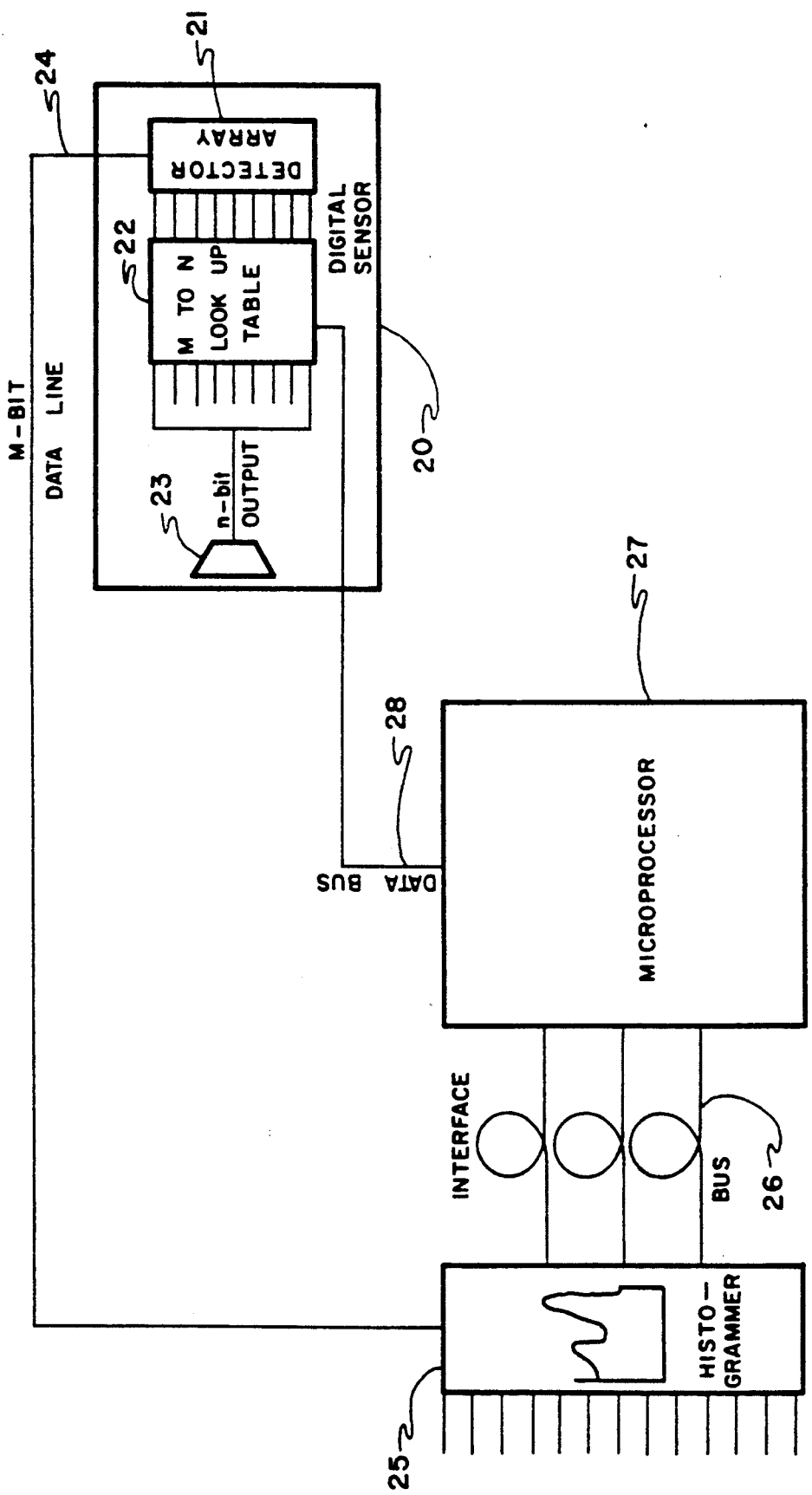
FIG. 2 is a block diagram of a second embodiment of the present invention for a digital sensor.

FIG. 2 depicts the block diagram of the preferred embodiment for a digital sensor. FIG. 20 digitizes the incoming signal at the detector array 21 to m bits, converts those bits to n bits ($n < m$) through an adjustable look-up table 22, and outputs the n bits via the digital output port 23. To arrive at the appropriate m-to-n look-up table values, a statistically significant period of m-bit data is first fed 24 directly to histogram means 25, where the m-bit histogram is determined and passed through interface 26 to processor 27. Here the histogram is normalized over the total number of samples as previously discussed to produce a $2^m$ set probability distribution, but, in addition, this distribution is subdivided into a $2^n$ equi-probability intervals or levels. In this fashion, the first of the $2^n$ output levels is set at the first of the $2^m$ levels whose preceding probability contributions add to $1/(2^n)$; the second level is set such that the next interval's contributions sum to $1/(2^n)$, etc. These levels form the look-up table or conversion map (non-linear function) that is then passed via line 28 to sensor 20 and stored. The output n bits converted via the table 22 will then be at maximum entropy.

Figure 3:
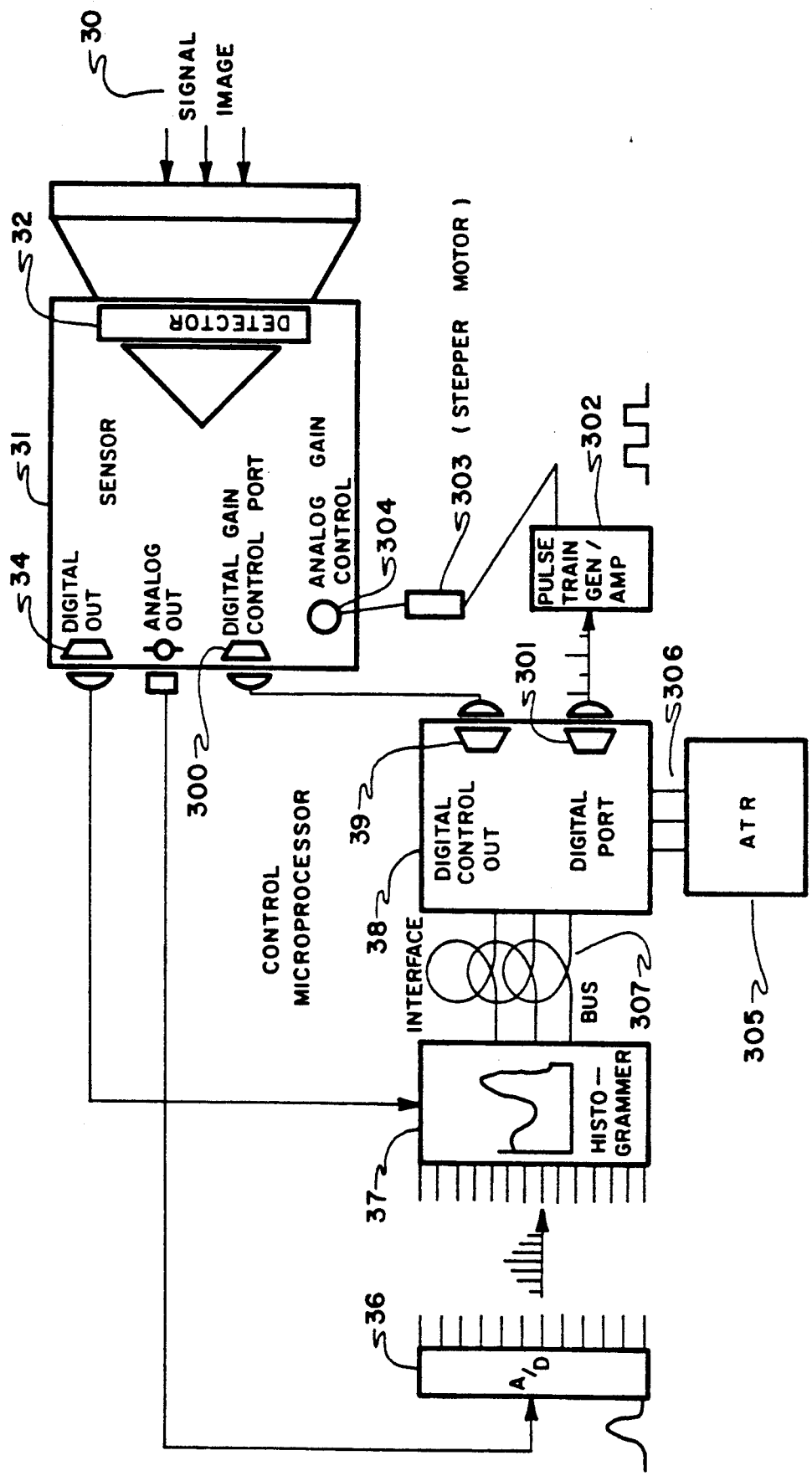
FIG. 3 is a block diagram of a third embodiment of the present invention for automatic target recognition.

FIG. 3 depicts the preferred embodiment of the present invention which will be discussed in conjunction with the operation of the present invention.

A continuous flow of signals 30, such as light photons from a scene, enter a sensor 31, are converted to corresponding analog voltage signals at a detector 32, and amplified by an adjustable gain 33. These signals are either sampled and clocked out of a digital port 34, and put into an appropriate format by a RS-170 video and output to an analog port 35. In the digital case, a statistically significant number of signal samples are fed directly to a real-time histogrammer 37; in the analog case, the signal is first piped through a uniform n-bit quantizer 36 and a statistically significant number of samples collected before being passed to histogrammer 37. Histogram data is then sent on to control microprocessor 38 which determines the associated probability distribution, $P(yi)$, and calculates the digital transinformation as discussed below.

If the sensor gain function is precisely known, the microprocessor computes directly the gain setting that produces the maximum DTI value; by using the first obtained distribution (the original $P(yi)$) as an approximation of the analog distribution, it computes new distributions and noise entropy for all possible known gain settings (subject to a programmed gain resolution) and outputs a digital gain control signal corresponding to the gain of max DTI. If the gain function is not well described, microprocessor 38 sends out a control signal incrementally varying the gain, first in an arbitrary direction (up or down), and subsequently in a direction that tends to increase the next computed value of DTI.

If desired, an approximation of the gain k is obtained for calculating $Hn(k)$ by examining the resultant increase in standard deviation of the yi. For example, if the initial DTI from an eight-bit system was 5.500 bits, the first gain adjustment might be an incremental gain increase and result in a new, reduced DTI of 5.42 bits; then the next gain adjustment command would be to decrease the gain. This process would continue iteratively, until microprocessor gain adjustments in either direction no longer resulted in increased TI. For the digital sensor, microprocessor gain control signals are delivered to an output port 39 and passed on to a sensor input port 300 where they are interpreted by sensor software and converted to an appropriate gain setting. In the analog sensor case, gain control signals are delivered to another digital output port 301 and sent to a pulse train generator/amplifier 302. The resultant pulse train is then clocked out to drive a gain potentiometer stepper-motor 303, thereby adjusting the sensor analog gain control 304.

In FIG. 3 there is also shown an automatic target recognition (ATR) control as subprocessing means 305. Subprocessing means 305 can be made to interrupt the control microprocessor 38 via an interface bus 306 to inform it of a Region-of-Interest (ROI) it wants considered for local DTI maximization (i.e. a rectangular region of an image containing a "hot spot"). Microprocessor 38 then restricts the focus of the real-time histogrammer 37 to samples from the ROI only (via another interface bus 307), and the control loop continues sensor adjustment as before until the local TI is maximized. In this way, an ATR could analyze many ROIs in an image at maximum local entropy in a relatively short period of time. For imaging sensors like state-of-the-art FLIRS with individually adjustable detector gains, each detector IFOV (Individual Field-of-View) can be viewed as a ROI; in this manner a composite image can be formed with DTI locally optimized throughout the image.

Figure 4:
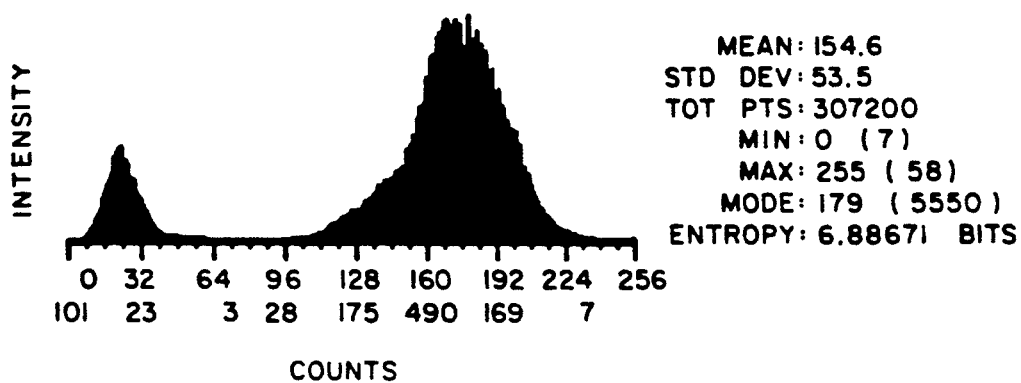
FIG. 4 is a histogram data plot indicative of the prior art.
Figure 6:
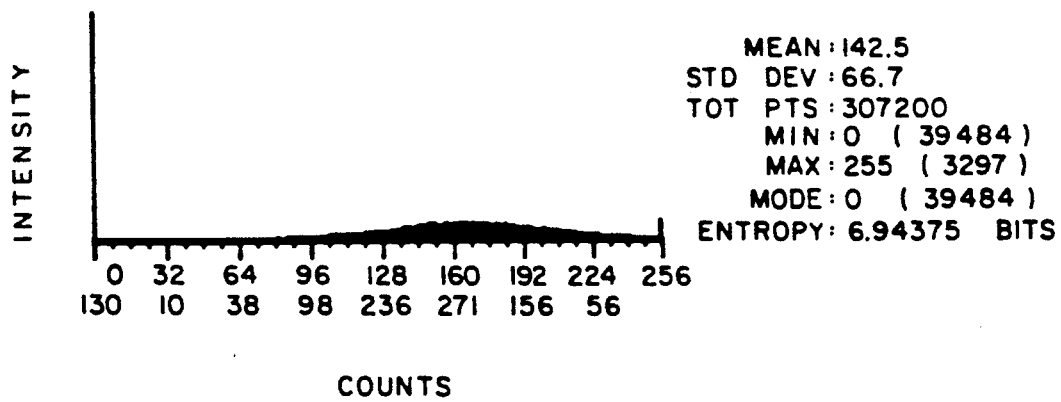
FIG. 6 is a histogram data plot from the present invention.
Figure 5:
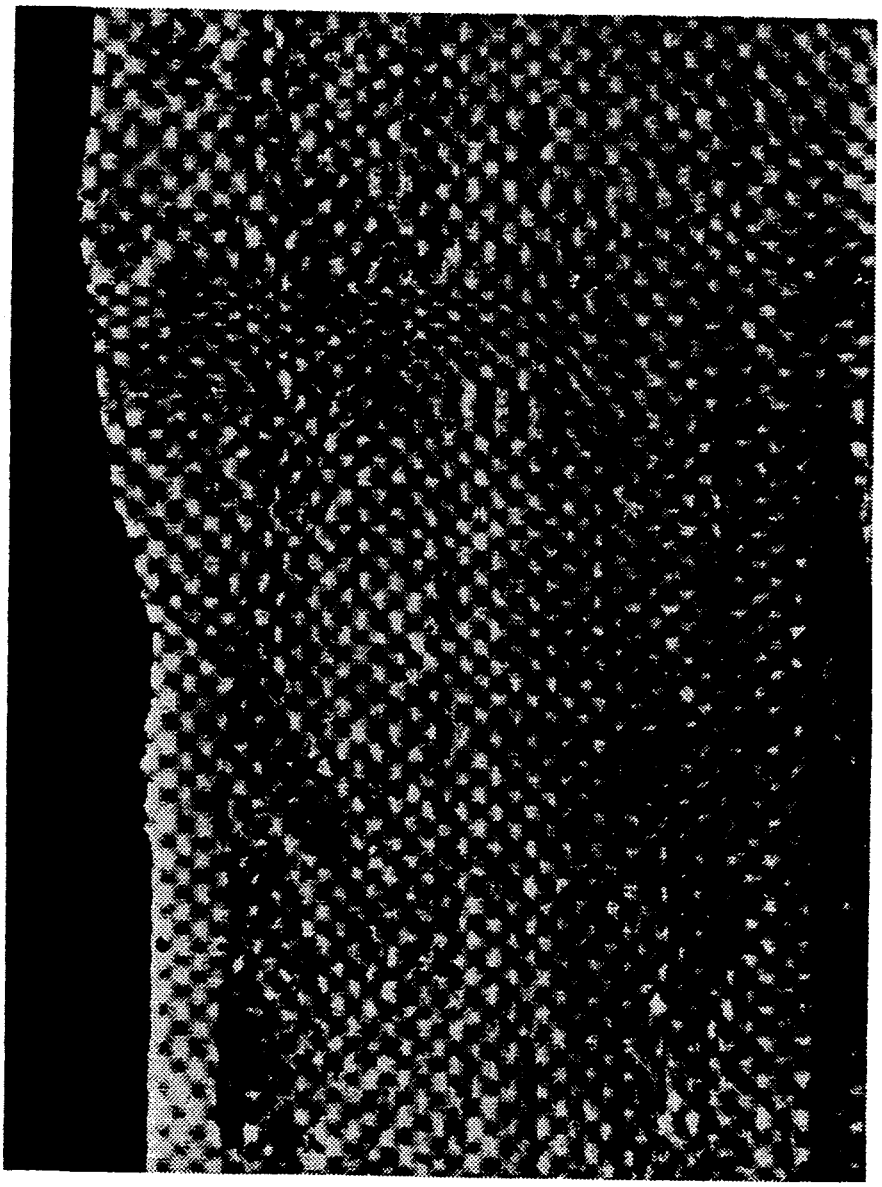
FIG. 5 is an automatic target recognition image indicative of the prior art.
Figure 7:
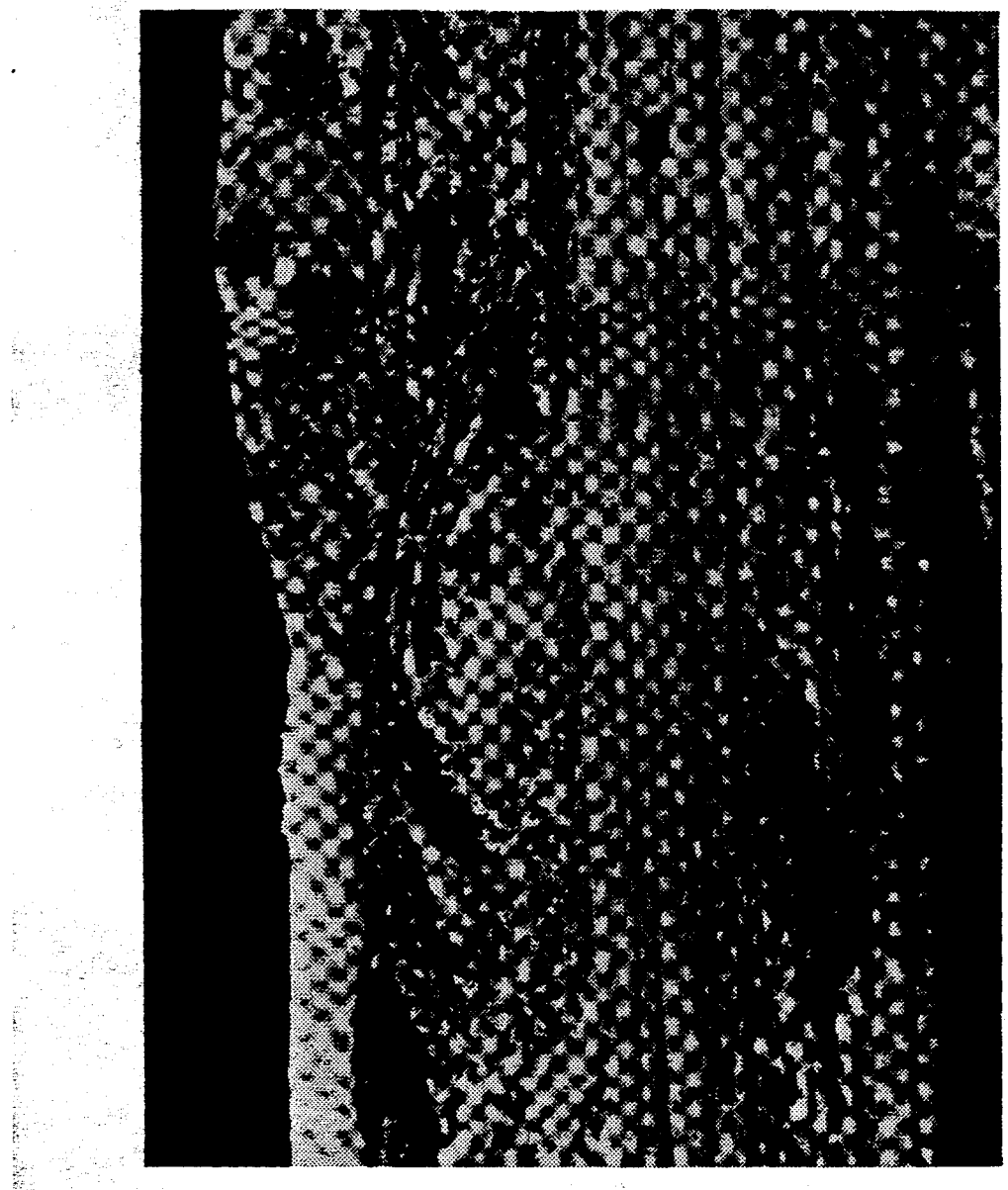
FIG. 7 is an automatic target recognition image from the present invention.

FIGS. 4 and 5 are an indicative histogram and ATR image output respectively, from the prior art, where no post-acquisition noise rejection was performed. FIGS. 6 and 7 are the histogram and image output respectively utilizing the present invention viewing the same scene.

A TRAPIX PLUS high performance virtual image processor was used to obtain what is shown in FIGS. 6 and 7, with specific components including model KAD8-3 triple 8-bit digitizer and model KVPP pixel processor (with 12-bit hardware histogrammer) all made by Recognition Concepts, Inc., Nev. As is clearly seen from the results, there is a marked increase in information obtained that is the result from the present invention.

Industrial applicability of this invention includes but is not limited to: Audio (such as music digitization), Electrical (such as feedback detector loops), Optical (such as photography, VCR), Image acquisition (such as machine vision for ATR, robotics, assembly line quality assurance), and Surveillance.

This preferred embodiment is not intended to restrict the invention to the precise embodiment or embodiments described.

I claim:

1. A method of optimal signal acquisition for an automatic real-time sensing system comprising:
   sampling a continuous train of sensor output signals whereby said signals are a function of a control signal;
   determining histogram data from said sample in order to establish the entropy of said sample;
   processing said histogram data utilizing a digital transinformation technique to output a feedback signal for the iterative adjustment of said control signal, thereby enhancing the operational capabilities of the system.

2. The method of claim 1 wherein said sampling further includes down-sampling.

3. The method of claim 1 wherein said signal is analog.

4. The method of claim 1 wherein said signal is digital.

5. The method of claim 1 wherein said digital transinformation technique includes:
   subtracting a real-time approximation of a determined noise entropy of said data from said determined entropy.

6. The method of claim 5 wherein said technique is iterative.

7. The method of claim 1 further including a subprocessing step which restricts said processing to one or more subsets of said data to produce a unique optimal control signal for each of said subsets processed.

8. The method of claim 7 wherein all of said subsets of said data are processed to produce an optimal composite signal.

9. The method of claim 7 wherein said subprocessing is utilized for automatic target recognition and said subset of said sample is a region-of-interest.

10. A feedback control system utilizing optimal signal acquisition for an automatic real-time sensing system comprising:
    a sensor;
    output signal means for generation of a continuous train of sensor output signals, whereby said output signals are a function of a control signal of said sensor;
    sampling means for determining a sample of said continuous train of output signals;
    means for determining a histogram of said sample of output signals;
    processing means utilizing a digital transinformation technique to process said histogram, thereby outputting a feedback signal;
    control adjusting means which utilize said feedback signal for adjustments of said control signal.

11. The system of claim 10 wherein said control signal means is a digital output port on a sensing system which outputs a digital signal.

12. The system of claim 10 wherein said control signal means further includes:
    an analog output port on a sensing system which outputs an analog signal and;
    a signal converting means to convert said analog signal to a digital signal.

13. The system of claim 10 wherein said means for determining a histogram is a histogrammer.

14. The system of claim 10 wherein said real-time sensing system is a forward-looking infrared video imagery system.

15. The system of claim 10 wherein said processing means includes a digital output port which outputs said feedback signal as a digital signal.

16. The system of claim 10 wherein said sampling means is a uniform n-bit quantizer.

17. The system of claim 10 wherein said sampling means is a down-sampling means.

18. The system of claim 10 wherein said processing means further includes a subprocessing means utilized to control said means for determining a histogram.

19. The system of claim 18 wherein said subprocessing means is an automatic target recognizer.

20. The system of claim 10 wherein said sensor is a digital sensor.

21. The system of claim 20 wherein said sampling means is a down-sampling means.

22. The system of claim 21 wherein said down-sampling means is a n/m-bit converter utilizing an adjustable look-up table.

* * * * *